2,723,193
HERBICIDAL PROCESS AND PRODUCT

Charles W. Todd, Westtown, Pa., assignor to E. I. du Pont de Nemours and Company, Wilmington, Del., a corporation of Delaware No Drawing. Application February 23, 1954, Serial No. 412,046

10 Claims. (Cl. 71—2.6)

This invention relates to herbicidal compositions and methods employing as an essential active ingredient a substituted urea represented by the formula:

(1)
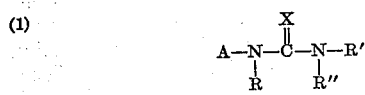

where A is a monovalent binuclear aromatic radical, X is oxygen or sulfur, and R, R' and R" are hydrogen or a monovalent aliphatic radical, with the proviso that at least one of said R, R' and R" is an aliphatic radical.

The term "binuclear aromatic radical" is used herein to include the naphthyl and biphenylyl radicals either substituted or unsubstituted. Substituents on the binuclear aromatic radical can be varied widely and include such groups as halogens; alkyl, preferably lower alkyl, such as methyl, ethyl, propyl and butyl and the isomeric propyl and butyl radicals; nitro; sulfo, and the like.

The ureas employed in the compositions and methods of this invention can be prepared by conventional methods, for example, by reaction of aliphatic and aromatic primary and secondary amines with an isocyanate, isothiocyanate, carbamyl chloride, or thiocarbamyl chloride. The following equations illustrate various methods with respect to the preparation of illustrative compounds:

(2)
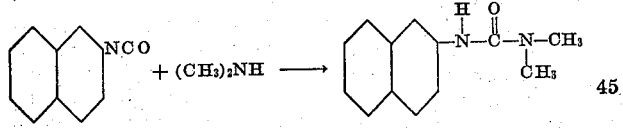

(3)
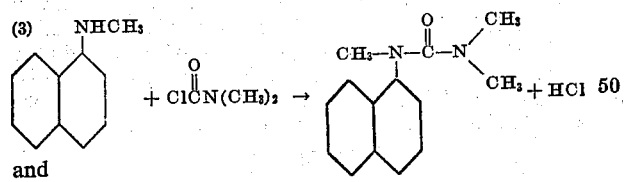

and (4)
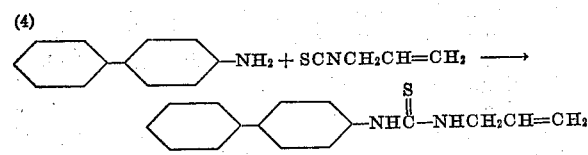

The above reactions are carried out by bringing the amine in contact with one or the other of the reactants specified usually in chemically equivalent amounts and, if necessary, heating to reaction temperature. It is in many cases preferable to use an excess of the amine, for example, 10 to 20% molar excess.

Altho not in general essential, inert liquid media, for example, dry benzene, dry toluene, dry dioxane, and the like can for the most part be advantageously employed in the methods outlined above. In employing the method illustrated by Equation 3 above, it is desirable to use an acid acceptor, for example, a tertiary amine such as triethylamine, dimethylaniline, pyridine, and the like. Ordinarily temperatures in the range of 0 to 100 C. or preferably 15 to 75° C. are satisfactorily employed for the above reactions.

Illustrative of the substituted ureas employed in the herbicidal compositions and methods of the invention are:

1. 1-(2-naphthyl)-3,3-dimethylurea
2. 1-(4-chloro-1-naphthyl)-3,3-dimethylurea
3. 3-(1-naphthyl)-1,1-dimethylurea
4. 3-(2-naphthyl)-1-allylthiourea
5. 3-(1-naphthyl)-1,1-dimethylthiourea
6. 3-(4-chloro-1-naphthyl)-1,1-dimethylurea
7. 3-(4-chloro-1-naphthyl)-1,1-diethylurea
8. 3-(naphthyl)-1-allylthiourea
9. 3-(1-naphthyl)-1,1-diethylurea
10. 3-(4-nitro-1-naphthyl)-1,1-dimethylurea
11. 3-(4-sulfo-1-naphthyl)-1,1-dimethylurea
12. 3-(4-sulfo-1-naphthyl)-1,1-dimethylurea, sodium salt
13. 3-(4-sulfo-1-naphthyl)-1,1-dimethylurea, calcium salt
14. 3 - [4 - (dimethylsulfamyl) - 1 - naphthyl] - 1,1 - dimethylurea
15. 1-(2-naphthyl)-1,3,3-trimethylurea
16. 3-(2-naphthyl)-1-methyl-1-propylurea
17. 3-(2-naphthyl)-1-allyl-1-methylurea
18. 3-(2-naphthyl)-1-methylurea
19. 1-(2-naphthyl)-1-methyl-3-allylthiourea
20. 3-(2-naphthyl)-1,1-diethylurea
21. 3-(1-naphthyl)-1,1-diisopropylurea
22. 3-(4-isopropyl-1-naphthyl)-1,1-dimethylurea
23. 1-(2-biphenylyl)-3,3-dimethylurea
24. 1-(4-biphenylyl)-3,3-dimethylurea
25. 1-(4-biphenylyl)-1,3,3-trimethylurea
26. 1-(4-biphenylyl)-3-allylthiourea
27. 1-(chloro-4-biphenylyl)-3,3-dimethylurea
28. 1-(4-biphenylyl)-1-allyl-3,3-dimethylurea
29. 1-(4-biphenylyl)-1-allyl-3-methylurea The herbicidal compositions of the invention are prepared by admixing one or more of the substituted ureas defined heretofore, in herbicidally effective amounts, with a conditioning agent of the kind used and referred to in the art as a pest control adjuvant or modifier in order to provide formulations adapted for ready and efficient application to soil or weeds (i. e., unwanted plants) using conventional applicator equipment.

Thus the herbicidal compositions, or formulations, are prepared in the form of either powdered solids or liquids. The liquid compositions, whether solutions or dispersions of the active substituted urea in a liquid diluent, contain as a conditioning agent a surface-active dispersing agent in amounts sufficient to render the liquid composition readily dispersible in water for application as an aqueous spray. The powdered solid herbicidal compositions preferably also contain a surface-active dispersing agent in amount sufficient to impart water dispersibility to the powdered compositions, altho the surface-active dispersing agent can be omitted if it is desired to apply the compositions by dusting rather than spraying. However, even tho the surface-active dispersing agent be omitted in the latter event, the herbicidal composition will still contain, of course, a powdered solid carrier or diluent as a conditioning agent.

The surface-active dispersing agents employed in the herbicidal compositions of the invention are sometimes referred to in the art as wetting, dispersing, or penetrating agents. They are agents which cause the compositions, whether in liquid or powdered solid form, to be easily dispersed in water to give aqueous sprays. They can be of the anionic, cationic, or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol, laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

Powdered or dust compositions of the invention whether or not also modified with a surface-active dispersing agent, to make them water dispersible are prepared by admixing one or more of the active substituted ureas with finely divided solids, preferably, talcs, natural clays, pyrophyllite, diatomaceous earth, and flours such as walnut shell, wheat, redwood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5 to 95% by weight of the herbicidal composition.

The active substituted ureas can be dissolved in organic solvents such as cyclohexanol, furfural, acetone, isobutanol, ethanol, isopropylacetate, and the like in the preparation of liquid compositions of the invention. Concentrated water-dispersible liquid compositions can be prepared by incorporating the ureas and surface-active dispersing agents in various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in the water-dispersible herbicidal compositions.

The herbicidal compositions of the invention can also have incorporated therein oils, fats, or similar vehicles such as cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms, it will be convenient to use a pellet form of the composition.

In another method of application for weed control, the ureas are incorporated with fertilizers to form either powdery or granular herbicidal compositions that can be used in the cultivation of agricultural crops.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i. e. whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredient.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In order that the invention may be better understood, the following examples are given in addition to the examples already given above. The examples illustrate typical herbicidal compositions of the invention, methods for their preparation, herbicidal applications, and the results obtained. The numbers following the tabulated ingredients represent parts by weight of the ingredients in the respective compositions.

EXAMPLE 1

A slight excess of dimethylamine was added slowly with stirring to 25.4 parts by weight of beta-naphthyl isocyanate contained in 125 parts by weight of ethyl ether. The entire mixture was refluxed for a period of 0.5 hour. After cooling, a total of 37 parts by weight of essentially pure 3-(2-naphthyl)-1,1-dimethylurea precipitated out of solution. Melting point 210.5–210.8° C.

Analysis.—Calc'd for $C_{13}H_{14}N_2O$: N, 13.05. Found: N, 12.77, 13.25.

The herbicidal properties of the substituted ureas are illustrated by the results obtained from application of aqueous sprays containing as the active ingredient the compound prepared as described above in this example. Tomato plants used as indicators of herbicidal activity were killed when observed four weeks after application thereto of a spray containing only 1% of the substituted urea. Quack grass to which was applied an aqueous dispersion containing 1% of the substituted urea was observed to be dead three months after treatment.

EXAMPLE 2

A total of 12.8 parts by weight of diethylamine was added slowly to 25.4 parts by weight of alpha-naphthyl isocyanate contained in 125 parts by weight of ethyl ether. This mixture was heated at reflux temperature for 0.5 hour. Upon cooling, 36.1 parts by weight of essentially pure 3-(1-naphthyl)-1,1-diethylurea crystallized out of solution. Melting point 125–126° C.

Analysis.—Calc'd for $C_{15}H_{18}N_2O$: N, 11.53. Found: N, 11.74, 11.99.

An aqueous dispersion containing 1% by weight of the compounds of this example was found upon application to quack grass to effect kill after three months.

EXAMPLE 3

*Water-dispersible powder*

The following powdered composition is adapted for dispersing in water for application as a spray for the destruction and prevention of weeds. The powdered composition is made by intimately mixing the listed ingredients using conventional mixing or blending equipment and then grinding the mixture to give a powder having an average particle size less than about 50 microns.

| | |
|---|---:|
| 1-(2-naphthyl)-3,3-dimethylurea | 75 |
| Fuller's earth | 23.75 |
| Sodium lauryl sulfate, 50% (wetting agent) | 1 |
| Methyl cellulose, 15 cps. (dispersing agent) | .25 |
| | 100.00 |

EXAMPLE 4

Dust formulation

The following composition is adapted for direct application as a dust for the destruction or prevention of weeds using conventional dusting equipment. The dust is made by blending or mixing the ingredients and grinding the mix to give compositions having an average particle size less than about 50 microns.

| | |
|---|---:|
| 1-(2-diphenylyl)-3,3-dimethylurea | 20 |
| Talc | 80 |
| | 100 |

EXAMPLE 5

Oil-water dispersible powder

The following powdered composition is adapted for use in the preparation of a spray composition using either an oil, water, or a combination of oil and water as the liquid diluent. The powder is made by mixing and grinding as in the case of powders of Example 4.

| | |
|---|---:|
| 1-(1-naphthyl)-1,3,3-trimethylurea | 70 |
| Alkylated aryl polyether alcohol (wetting and dispersing agent) | 4 |
| Fuller's earth | 26 |
| | 100 |

EXAMPLE 6

Water-dispersible liquid composition

The following composition is in a liquid form and is adapted for addition to water to give an aqueous dispersion for application as a spray. The urea herbicides are generally quite insoluble in most oils. Therefore, the liquid compositions ordinarily are not complete solutions but rather are dispersions of solid in an oil. The liquid or fluid composition shown is prepared by thoroughly mixing and dispersing the active compound and conditioning agents in an organic liquid diluent.

| | |
|---|---:|
| 3-(1-naphthyl)-1,1-diethylurea | 25 |
| Long chain fatty alcohol sulfate (emulsifying agent) | 2 |
| Goulac (dispersing agent) | 3 |
| Kerosene | 70 |
| | 100 |

EXAMPLE 7

Granular composition

The following composition is adapted for application by means of a fertilizer spreader apparatus or similar equipment. The composition is readily prepared by mixing the ingredients with water to form a paste. The paste is then extruded, dried, and ground to give the desired granular size. Preferably, the granules will be in the order of one-thirty second to one-quarter inch diameter.

| | |
|---|---:|
| 3-(4-biphenylyl)-1,1-dimethylurea | 10 |
| Goulac (dispersing agent) | 3 |
| Hydrocarbon oil | 1 |
| Dextrin (binding agent) | 20 |
| Fuller's earth | 66 |
| | 100 |

This application is a continuation in part of my copending application Serial No. 186,118 filed September 21, 1950, now abandoned.

Those skilled in the art will appreciate that other substituted ureas in addition to those specifically named above can be prepared and employed in the compositions and methods of the invention. Thus the foregoing detailed description has been given for clearness of understanding only and no unnecessary limitations are to be understood therefrom.

I claim:

1. A method for the control of weeds which comprises applying to a locus to be protected, in amount sufficient to exert a herbicidal action, a substituted urea represented by the formula

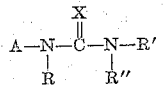

where A is a monovalent binuclear aromatic radical selected from the group consisting of naphthyl, halonaphthyls, lower alkyl naphthyls, nitronaphthyls, sulfonaphthyls, biphenylyl, halobiphenylyls, lower alkyl biphenylyls, nitrobiphenylyls, and sulfobiphenylyls, X is oxygen, and R, R' and R'' are selected from the group consisting of hydrogen and monovalent aliphatic radicals of 1 to 3 carbon atoms inclusive, with the proviso that at least one of said R, R' and R'' is an aliphatic radical.

2. A herbicidal composition comprising a surface-active dispersing agent and, in amount sufficient to exert herbicidal action, a substituted urea represented by the formula

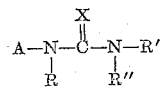

where A is a monovalent binuclear aromatic radical selected from the group consisting of naphthyl, halonaphthyls, lower alkyl naphthyls, nitronaphthyls, sulfonaphthyls, biphenylyl, halobiphenylyls, lower alkyl biphenylyls, nitrobiphenylyls, and sulfobiphenylyls, X is oxygen, and R, R' and R'' are selected from the group consisting of hydrogen and monovalent aliphatic radicals of 1 to 3 carbon atoms inclusive, with the proviso that at least one of said R, R' and R'' is an aliphatic radical.

3. A herbicidal composition comprising a surface-active dispersing agent and, in amount sufficient to exert herbicidal action, 1-(2-naphthyl)-3,3-dimethylurea.

4. A herbicidal composition comprising a surface-active dispersing agent and, in amount sufficient to exert herbicidal action, 3-(4-chloro-1-naphthyl)-1,1-dimethylurea.

5. A herbicidal composition comprising a surface-active dispersing agent and, in amount sufficient to exert herbicidal action, 3-(1-naphthyl)-1,1-diethylurea.

6. A herbicidal composition comprising a surface-active dispersing agent and, in amount sufficient to exert herbicidal action, 3-(4-biphenylyl)-1,1-dimethylurea.

7. A method for the control of weeds which comprises applying to a locus to be protected, in amount sufficient to exert herbicidal action, 1-(2-naphthyl)-3,3-dimethylurea.

8. A method for the control of weeds which comprises applying to a locus to be protected, in amount sufficient to exert herbicidal action, 3-(4-chloro-1-naphthyl)-1,1-dimethylurea.

9. A method for the control of weeds which comprises applying to a locus to be protected, in amount sufficient to exert herbicidal action, 3-(1-naphthyl)-1,1-diethylurea.

10. A method for the control of weeds which comprises applying to a locus to be protected, in amount sufficient to exert herbicidal action, 3-(4-biphenylyl)-1,1-dimethylurea.

OTHER REFERENCES

Chemical Abstracts, vol. 30 (1936), col. 5950[4].
Chemical Abstracts, vol. 26 (1932), col. 5556[4].